United States Patent [19]

Kawahara

[11] 3,817,635

[45] June 18, 1974

[54] DEVICE FOR MEASURING THE ACTUAL DIMENSION OF AN OBJECT AT THE FORWARD END PORTION OF AN ENDOSCOPE

[75] Inventor: Ichizo Kawahara, Tokyo, Japan
[73] Assignee: Olumpus Co., Ltd., Tokyo, Japan
[22] Filed: Aug. 7, 1972
[21] Appl. No.: 278,453

Related U.S. Application Data

[60] Continuation-in-part of Ser. No. 114,240, Feb. 10, 1971, abandoned, which is a division of Ser. No. 749,809, Aug. 2, 1968, Pat. No. 3,595,200.

[30] Foreign Application Priority Data

| Aug. 8, 1967 | Japan | 42-50507 |
| Aug. 8, 1967 | Japan | 42-50508 |
| Aug. 8, 1967 | Japan | 42-50510 |
| Aug. 29, 1967 | Japan | 42-73425 |

[52] U.S. Cl. ............ 356/171, 356/11, 356/156, 128/6
[51] Int. Cl. ...... A61b 1/06, G01b 11/02, G01c 3/24
[58] Field of Search ........ 356/3, 8, 17, 51, 21, 156, 356/171, 11; 128/6, 8

[56] References Cited
UNITED STATES PATENTS

| 2,316,751 | 4/1943 | Adler | 356/1 |
| 2,554,798 | 5/1951 | Schwartz et al. | 356/8 |
| 3,007,365 | 11/1961 | Sho | 356/17 |
| 3,096,756 | 7/1963 | Rosenfeld et al. | 356/237 |
| 3,123,915 | 3/1964 | Wilkinson | 356/21 |
| 3,270,641 | 9/1966 | Gosselin | 128/4 |
| 3,682,552 | 8/1972 | Hartman | 356/3 |
| 3,712,737 | 1/1973 | Bitterlich et al. | 356/8 |

FOREIGN PATENTS OR APPLICATIONS

| 557,456 | 8/1923 | France | 356/21 |
| 729,094 | 11/1942 | Germany | 356/21 |

*Primary Examiner*—Ronald L. Wibert
*Assistant Examiner*—Paul K. Goodwin
*Attorney, Agent, or Firm*—Kurt Kelman

[57] ABSTRACT

The invention disclosed provides a device for measuring the actual dimension of an object in the field of view of an endoscope, the forward end portion of which is adapted to be inserted into a hollow portion of a living body or the like for the inspection thereof. The endoscope is provided with a fixed focal length objective lens system, a differential mechanism, and a sizing means along with adjusting means for the objective lens system, and a distance measuring means. The actual size of an object appearing in the field of view is measured directly by differentially coupling the differential mechanism with the sizing means and either the adjusting means for the objective lens system, or the distance measuring means for measuring the size of the object appearing in the field of view. An indicating means coupled with the differential mechanism indicates directly the actual dimension of the object regardless of the variation in the distance between the object and the forward end portion of the endoscope.

6 Claims, 23 Drawing Figures

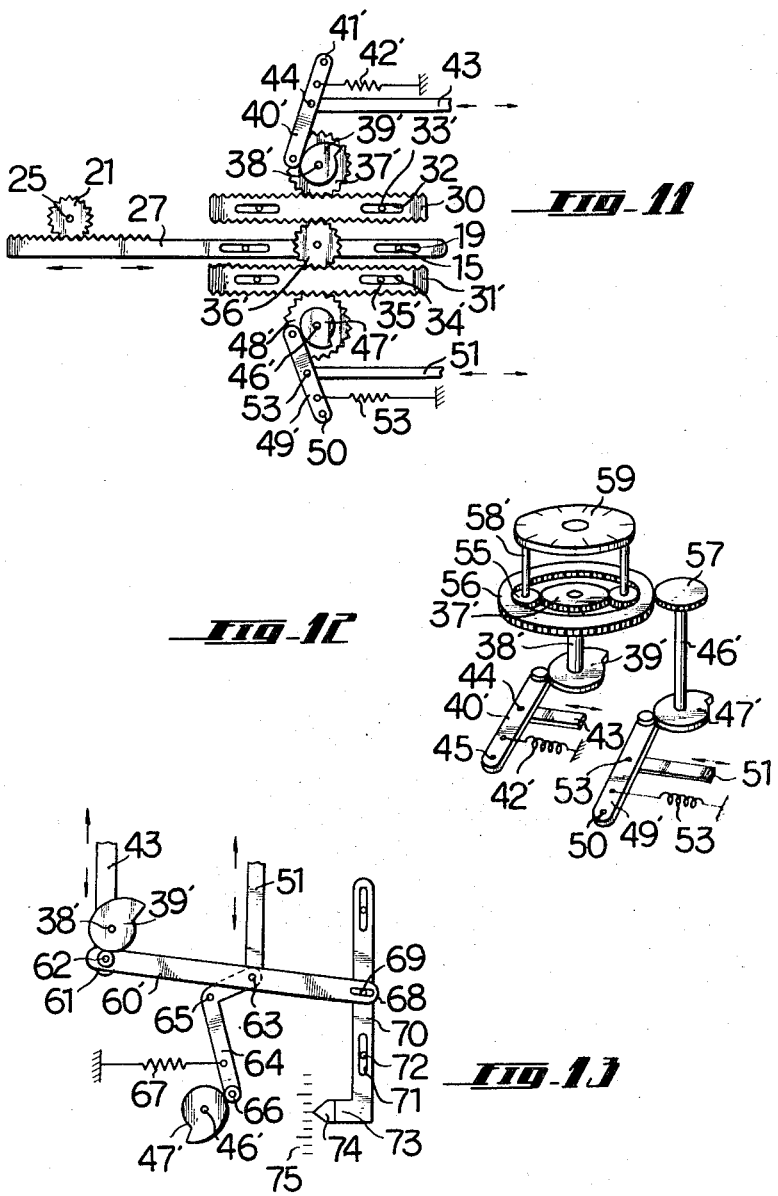

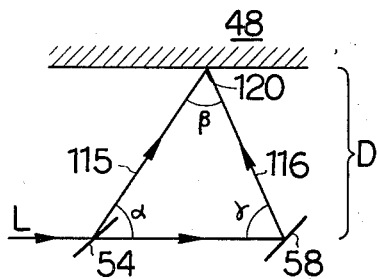
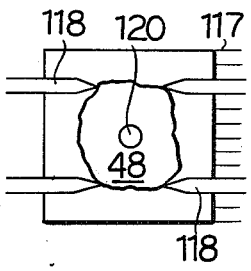
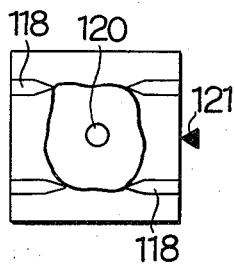
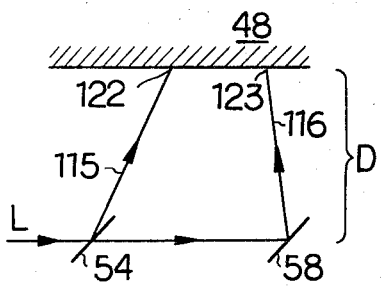
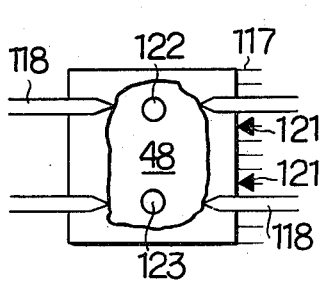
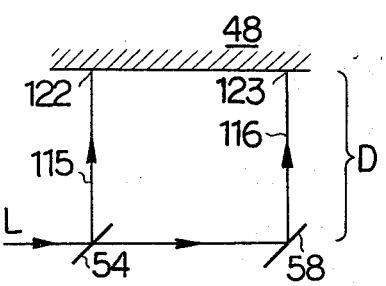
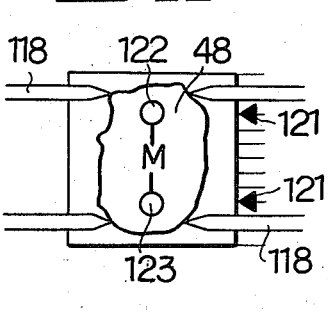

DEVICE FOR MEASURING THE ACTUAL DIMENSION OF AN OBJECT AT THE FORWARD END PORTION OF AN ENDOSCOPE

This application for U.S. Letters Patent is a continuation-in-part of copending U.S. application Ser. No. 114,240, filed Feb. 10, 1971, now abandoned, which in turn is a divisional of U.S. application Ser. No. 749,809, filed Aug. 2, 1968, now U.S. Pat. No. 3,595,200, issued July 27, 1971.

The present invention relates to a device for measuring the actual dimension of an object within the field of view of an endoscope having a fixed focal length objective lens system. More particularly, the present invention provides an endoscope for indicating directly the actual dimension of an object within the field of view regardless of the variation in the distance between the object and the forward end portion of the endoscope.

In using an endoscope, it is necessary to successively and intermittently observe an object such as a part of a hollow portion of a living body, in order to find out how the portion to be inspected changes with time. In comparing the results of an inspection with those obtained by previous inspections, it is necessary to determine exactly the actual dimension of the object so that correct judgement can be made of any variation in object size with time.

Heretofore, the amount of the adjustment of the objective lens system of the endoscope for sharply viewing an object was by assuming the distance between the object and the forward end portion of the endoscope. However, since wide angle objective lens systems having a relatively greater depth of focus are now being incorporated in endoscopes, the exact adjustment of the focus is very difficult to assume thereby lowering the accuracy of the inspection, and determination of the actual dimension of the object.

In another prior art method, a light beam having a predetermined intensity is emitted from the forward end portion of the endoscope so as to illuminate the object. The light reflected from the object is received by a sensing means provided in the forward end portion of the endoscope such that the intensity of the reflected light is converted into an electrical value from which the distance between the object and the forward end portion of the endoscope is estimated. However, the reliability of this method for determining distance is relatively low because the angle formed between the optical axis of the objective lens system, and the normal to the surface of the object tends to vary each time the inspection is effected thereby resulting in a variation in the quantity of light received by the sensing means.

It has now been found that by practice of the present invention, there is provided a device which overcomes many of the disadvantages of endoscopes of the prior art, and thus provides a novel and useful device for measuring the actual dimension of an object appearing in the field of view of the endoscope regardless of any change in distance between the object and the forward end portion of the endoscope.

Generally, the present invention provides a novel and useful device for measuring the actual dimension of an object appearing in the field of view of an endoscope having a fixed focal length objective lens system regardless of the variation in the distance between the object and the forward end portion of the endoscope. The present endoscope includes a differential mechanism which differentially couples a sizing means for measuring the size of the object appearing in the field of view of the endoscope with either a focus adjusting means or a distance measuring means.

In an endoscope having a fixed focal length objective lens system, the apparent size of the image of an object appearing in the field of view of the endoscope varies in inverse proportion to the variation in the distance between the object and the forward end portion of the endoscope. Thus, the actual dimension of the object appearing in the field of view of the endoscope cannot be determined by merely measuring the apparent size of the image of the object as viewed in the field of the endoscope. Compensation means must be introduced which compensate for changes in distance between the object and the forward end portion of the endoscope before a correct measurement value is possible. The actual size of the object is then achieved on the basis of the measurement of the apparent size of the image by way of the compensation means.

The present invention utilizes one or two light beams of substantially parallel rays emitted from the forward end portion of the endoscope toward the object. The thus emitted light beam or beams form bright light spots, respectively on the surface of the object which may be viewed through the endoscope together with the image of the object. The position of the light spots with respect to the field of view of the endoscope, or the relative positions of the light spots on the object vary as the distance between the object and the forward end portion of the endoscope varies. Thus, the distance between the object and the forward end portion of the endoscope may be determined or fixed on the basis of the relative position of the light spots with respect to either the field of view of the endoscope, or with respect to each other on the object.

The direction of the light beams from the present device may be controlled by operating a control mechanism provided relative a control housing of the endoscope. The control mechanism is connected to the forward end portion of the endoscope through an elongated tube which preferably is an elongated flexible tube, the flexure of which is controlled by means of a control means provided in the control housing. When the direction of the light beams from the endoscope is changed, the relative positions of the light spots formed on the surface of the object are varied. Thus, when the light beams are brought into a predetermined relation with respect to the field of view, or when the light spots are brought into registration with each other, the distance between the object and the forward end portion of the endoscope may be determined or fixed on the basis of the amount of operation of the control mechanism.

In accordance with a feature of the present invention, a differential mechanism is provided in the endoscope. The differential mechanism differentially couples either the adjusting means for the objective lens system or the distance measuring means with an indicating means for size determination. Operation of the differential mechanism is thus indicative of the distance between the object and the forward end portion of the endoscope. The effect of variation in the apparent size of the image of the object resulting from variation in the distance between the object and the forward end porential mechanism thereby permitting the actual dimension of the object within the field of view to be indicated correctly by the indicating means regardless of any variation in the distance between the object and the forward end portion of the endoscope.

Other features of the present invention will be more apparent from the following description of the present invention taken with reference to the accompanying drawings.

IN THE DRAWINGS

FIG. 1 diagrammatically illustrates operation of an endoscope of the present invention when the actual size of an object is measured by differentially coupling a differential mechanism with a sizing means and the distance measuring means;

FIG. 2 diagrammatically illustrates operation of an endoscope of the present invention when the actual size of an object is measured by differentially coupling a differential mechanism with a sizing means and an adjusting means for the objective lens system;

FIG. 3 exemplifies a side elevational view of an endoscope of the present invention;

Figure 8:
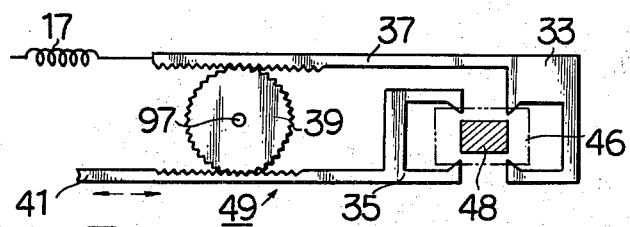
Figure 9:
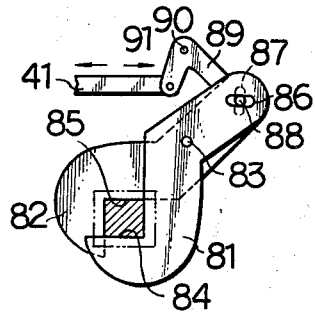
Figure 10:
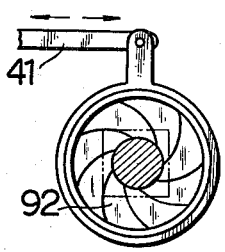
Figure 14:
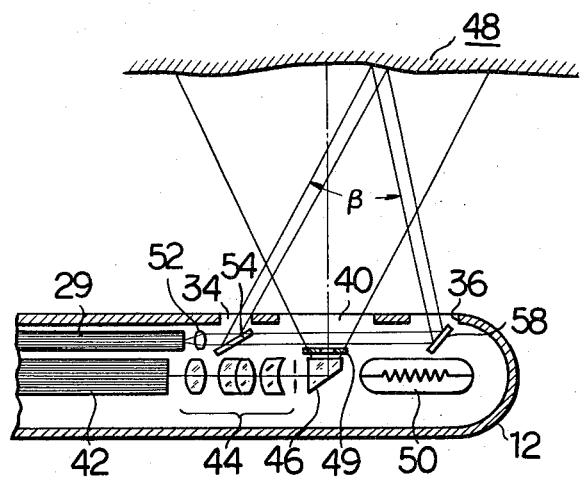
Figure 15:
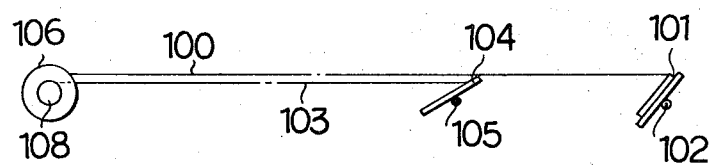
Figure 16:
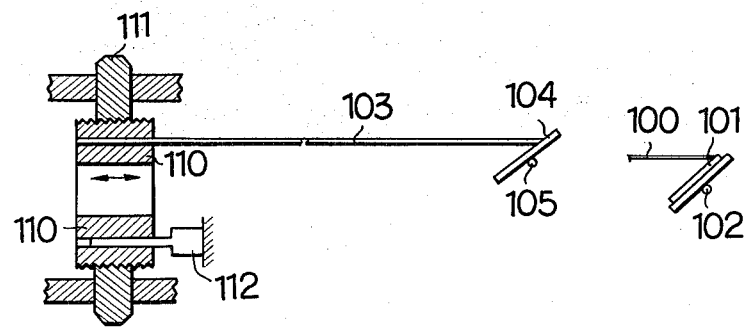

FIG. 8 diagrammatically shows one means for measuring the size of an object being viewed;

FIG. 9 diagrammatically shows an embodiment means for measuring the size of an object being viewed;

FIG. 10 diagrammatically shows yet another embodiment means for measuring the size of an object being viewed;

FIG. 11 illustrates a differential mechanism for use in the present device;

FIG. 12 illustrates an embodiment differential mechanism utilizing a planetary gear system;

FIG. 13 illustrates yet another embodiment differential mechanism wherein connecting rods and cams are utilized;

FIG. 14 illustrates how measurement of distance may be effected when light beams are brought into registration on the object;

FIG. 15 illustrates means for changing direction of light beams for measuring distances;

FIG. 16 illustrates an embodiment means for changing direction of light beams for measuring distances;

FIG. 17 diagrammatically illustrates how measurement may be effected when light beams form one spot on the object;

FIG. 18 illustrates how registration of beams of FIG. 17 may appear through an ocular means;

FIG. 19 illustrates a variation of FIG. 18 including a separate indicator;

FIG. 20 illustrates how measurement may be effected when light beams are non-parallel and form two light spots on the object;

FIG. 21 illustrates how registration of the light beams of FIG. 20 may appear through an ocular means;

FIG. 22 illustrates how measurement may be effected when light beams are parallel and form two light spots on the object; and FIG. 23 illustrates how registration of the light beams of FIG. 22 may appear through an ocular means.

Figure 1:
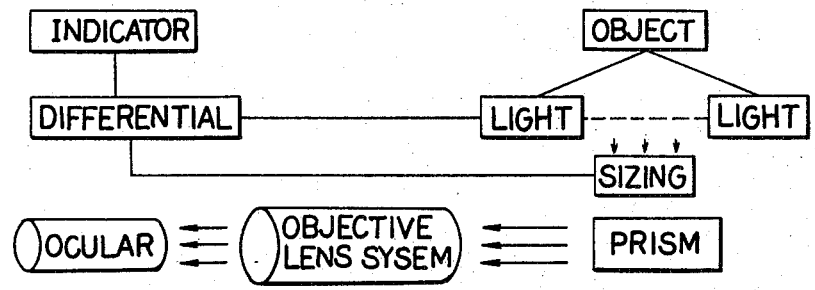

Referring to FIG. 1, operation of an endoscope of the present invention is diagrammatically illustrated when the actual size of an object is measured using a differential mechanism for coupling a sizing means and the distance measuring means. In FIG. 1, light beam directing elements forming the distance measuring means identified "light," direct light beams from the forward end of the endoscope for registration onto the object being viewed. Light from the object passes the object sizing means, identified "sizing," into a prism from which an image of the field of view is directed to the objective lens system for viewing by an individual using the ocular element.

Using the differential mechanism coupled to either one or both of the light beam directing elements, and the sizing means permits reading of the actual size of the object being viewed by way of an indicator disposed for operation relative the differential mechanism. Thus, when the distance from the forward end of the endoscope changes, for example, a corresponding change is effected in the registration of the light beams on the object. The light beams sense the distance to the object and signal this value to the differential mechanism. The differential mechanism reflects a variation of distance value with the sizing element measuring the object and then corrects for any change thereby permitting direct reading of the object size by means of the indicator.

Figure 2:
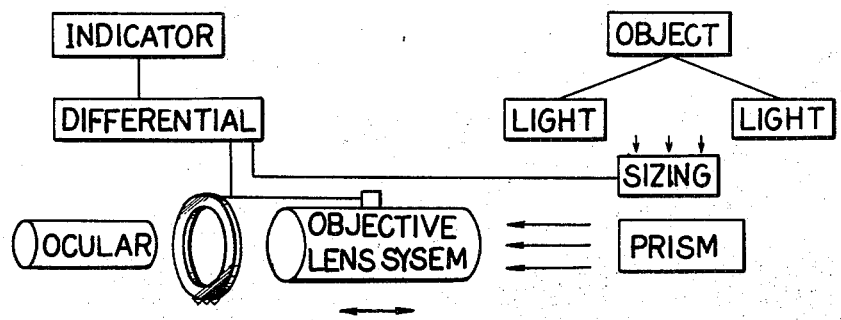

FIG. 2 illustrates operation of an endoscope of the present invention when the actual size of an object is measured using a differential mechanism for coupling a sizing means and an adjusting means for the objective lens system. The light beam directing elements fix the distance from the forward end of the endoscope to the object. Light from the object passes the object sizing means as in FIG. 1 for viewing by the ocular element. However, any change in position of the objective lens system is correspondingly reflected in the object sizing means with the differential mechanism accounting for such changes and presenting an actual value of the object size to an indicator for direct reading.

Figure 3:
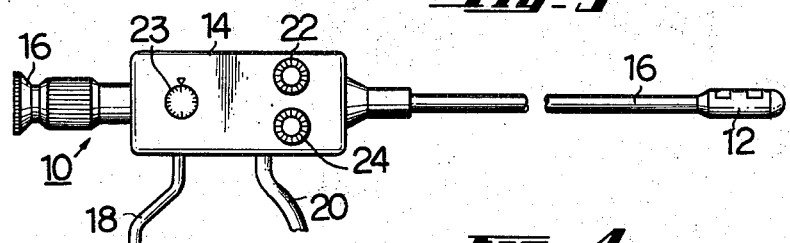
Figure 4:
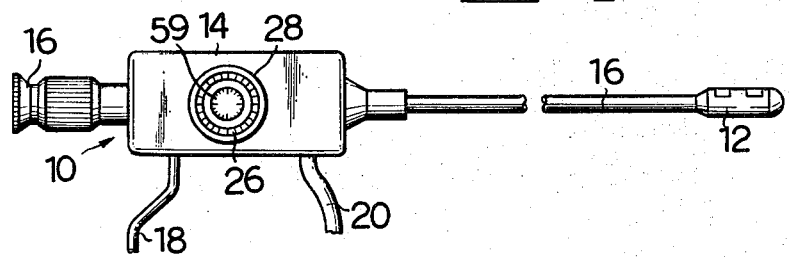
FIG. 4 is an opposite side elevational view to that of FIG. 3.

FIGS. 3 and 4 illustrate endoscope device 10 comprising a forward end portion 12 connected to a control housing 14 by means of elongated tube 16, which is preferably an elongated flexible tube. Control housing 14 is provided with a focus adjusting means, ocular means 16, and electric power supplying lead wires 18. Means may be included for effecting the bending of elongated tube 16 as desired.

Flexible tube 20, through which light may pass such as by means of optical fibers or the like, may be detachable secured to housing 14 and provides conduit means for passing light to end portion 12 by means of optical fibers. A light unit which may include a casing, light source, light reflector and light ray lens condenser may be included as desired to provide light having substantially parallel rays to tube 20.

FIGS. 3 and 4 illustrate an example of the appearance of the endoscope of the present invention for measuring the actual dimension of the field of view of the endoscope. FIG. 1 shows endoscope 10 with knob 22, for example, for operation to shaft 38' shown in FIG. 11 or 13, while knob 24 provides an operating knob fixed to the shaft 46' shown in FIG. 11 or 13. The indicating means 23 is fixed to the shaft 25 shown in FIG. 11. The indicating means 23 may be replaced by the index pointer 74 and the graduations 75 as shown in FIG. 13.

FIG. 4 shows endoscope 10 in which the device as shown in FIG. 12 is incorporated. In this case, the operating knobs 26, 28 are disposed for effecting object lens adjustment or the distance measurement. These knobs are arranged concentrically together with the indicating means 59 by utilizing conventional gearing means for facilitating the operation of the device.

Figure 5:
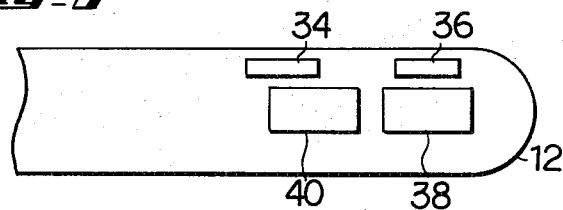
FIG. 5 is a partial view showing the top forward end portion of the endoscope of FIG. 3 as seen from the object being viewed.

FIG. 5 presents a partial top view of forward end portion 12 of the present endoscope. Light beams having parallel rays pass through windows 34 and 36 respectively, light from a suitable light source from portion 12 passes through illumination window 38, and viewing may be effected using viewing window 40.

Figure 6:
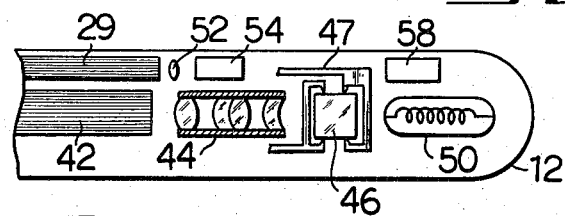
FIG. 6 is a fragmentary sectional view illustrating generally the internal portion of that forward end portion shown in FIG. 5.

FIG. 6 presents generally an example of arrangement of elements within the housing of the forward end portion 12 of the present endoscope.

As seen in FIG. 6, an image transmitting optical system 42, such as a fiber optical system by way of example, extends through elongated tube 16 from control housing 14, to the forward end portion 12 of the endoscope. A fixed objective lens system 44 is provided in the forward end portion 12 in front of the forward end of the image transmitting optical system 42 in the optical axis thereof. A light reflecting means 46 such as a prism is located in front of the objective lens system 44. Thus, light from an object 48, FIG. 14, passing through viewing window 40 is reflected by light reflecting means 46 toward and through the objective lens system 44 and to the forward end, in housing 14, of optical system 42 to form an image of the object which may be viewed through ocular means 16. The image formed on the forward end surface of the image transmitting optical system 42 is transmitted therethrough to the rearward end thereof, i.e., the end part without housing 14. The rearward end of the image transmitting optical system 42 is located in the control housing 14 in front of the ocular means 18, thereby permitting the thus transmitted image of the object to be viewed through the ocular means 16. Adjustment of the focusing of the objective lens system 44 can be effected by means of the provided adjusting means.

A light source 50, such as a lamp or the like, is located in the forward end portion 12 and may be energized by an external power source through wires 18 extending from the control housing 14 through the elongated tube 16. Light source 50 illuminates the object through the window 38. The light source 50 may be replaced by a light conducting fiber optical system extending through the elongated tube 16 from the control housing 14 to the forward end portion 12. In this case, the rearward end of the light cnducting fiber optical system adjacent to or in control housing 14 is illuminated by an external light source, i.e., simply light source 50 externally disposed, and the light transmitted through the light conducting fiber optical system to the forward end thereof is emitted therefrom toward the object by way of light illumination window 38.

In accordance with one of the features of the present invention, a light projecting means for emitting a pair of light beams is provided in order to measure the distance between object 48 and the forward end portion 12 of the endoscope. The light projecting means may include a single fiber optical system 29, a single collimating lens system 52, a semi-transparent light reflecting mirror 54, movable by wire means 56, FIG. 15, and a total light reflecting mirror 58 movable by second wire means 60, FIG. 15. Mirrors 54 and 58 are located obliquely in the optical axis of the collimating lens system 52. Mirror 58 is remotely spaced from semi-transparent light reflecting mirror such that two light beams may be directed through mirrors 54 and 58 toward object 48. Alternatively, mirror 54 may be a total light reflecting mirror in which case a second fiber optical system similar to that of elements 29 and 52, provide light separately to mirror 58. Also, in this latter embodiment, mirrors 54 and 58 may be replaced with prism members as desired.

Fiber optical system 20 extends from the control housing 14 through the elongated tube 16 to the forward end portion 12. The rearward end of the fiber optical system 20 adjacent to or in the control housing 14 is illuminated by an external light source such that the light is transmitted through the fiber optical system 20 to the forward end 12 of endoscope 10. The light emitted from at the forward end of the optical system is collimated by collimating lens system 52 to form a fine light beam having substantially parallel rays. The light beam may be reflected partly by the semi-transparent light reflecting mirror 54 toward the object 48 through a window 34 provided in the wall of the forward end portion 12. The remaining part of the light beam passing through semi-transparent light reflecting mirror 54 is reflected by total light reflecting mirror 58 toward the object 48 through a window 36 provided in the wall of the forward end portion 12.

Thus, the light beams having substantially parallel rays project to the object 48 from the light reflecting means 54 and 58 to form two small light spots on the surface of the object 48. These light spots may then be viewed through the viewing optical system comprising, viewing window 40, light reflecting means 46, objective lens system 44, image transmitting optical system 42 and ocular means 16, together with the field of view available by the objective lens system 44.

In accordance with the present invention, sizing means 47 is provided for measuring the actual dimension of object 48 in the field of view. The actual dimension of the object in the field of view available by an objective lens system varies in proportion to the distance between the object and the forward end portion of the endoscope.

Figure 7:
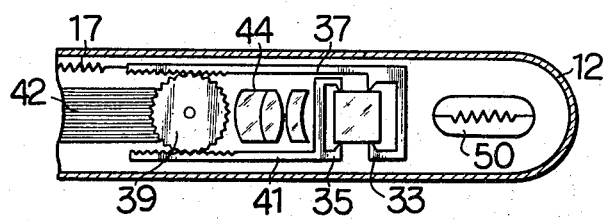
FIG. 7 is a further fragmentary sectional view showing associated means in the forward part of the endoscope for measuring the size of an object being viewed.

FIGS. 7 to 10 show various means for measuring the actual size of the object. In FIG. 7, the sizing means is illustrated in greater detail relative to some additional elements forming the forward end 12 of the endoscope. It is recognized that not all of the elements are illustrated in FIG. 7 for simplicity of discussion and illustration.

The sizing element of FIG. 7 may be defined as a caliper device 49, FIG. 8, having object measuring spaced pointers directed toward each other at the forward end thereof. One set of pointers is disposed on leg 33 whereas another set of pointers is disposed on leg 35. Leg 33 is joined to rod 37 having teeth for engagement with gear 39, and similarly, leg 35 is joined to rod 41 having teeth for engagement also with gear 39. Gear 39 is fixed for rotation about an axle provided in the center thereof. Thus, referring to FIg. 8, operation of leg 41, for example, by a suitable knob means on housing 14 causes movement in direction of the arrow of FIG. 7. Movement of rod 39 causes corresponding movement of rod 37 by means of gear 39. Rod 37 is desirably spring biased to effect convenient operation of the unit.

FIG. 9 illustrates an enbodiment sizing device having a pair of blades 81 and 82 which are pivotally mounted on a stationary pin 83 in symmetrical relation to each other. The blades 81, 82 are provided with cut out portions 84, 85, respectively, which are adapted to size the contour of the image of the object appearing in the focal plane of the ocular means or some other focal plane formed in the viewing optical system of the endoscope.

Each of the blades 81 and 82 is provided with an elongated slot 86 or 87, the slots 86 and 87 being oppositely inclined to each other as shown in FIG. 9. A pin 88 secured to one end of a bell crank lever 89 pivoted at 90 engages with both the elongated slots 86 and 87. A pin 91 secured to the other end of the bell crank lever 89 pivotally mounts thereon a rod 41.

Thus, when the rod 41 is moved in the direction of the arrow, the blades 81 and 82 are oppositely swung by virtue of the engagement of the pin 88 with the inclined slots 86 and 87 in the blades 81, 82 toward or apart from each other depending upon the sense of the movement of the rod 41. Therefore, the image of the object may be sized by the blades 81, 82 by moving rod 41. The rod 41 is coupled with a differential mechanism as indicated subsequently.

FIG. 10 shows a modified form of the sizing device of FIG. 9. In this embodiment, the blades 81, 82 of FIG. 9 are replaced by an iris diaphragm having a plurality of blades 92 which are actuated by moving the rod 41 so as to vary the aperture size. The rod 41 is connected to the differential mechanism in like manner as in the case of embodiments shown in FIGS. 8 and 9.

The differential mechanism comprises a pair of movable members and a third movable member differentially coupled with each of the pair of movable members so that the third movable member is moved by the resultant amount differentially given from the pair of movable members. Thus, rod 41 may be operably connected to one of the pair of movable members and the other of the pair of movable members may be operably connected to the means for adjusting the lens system or the distance measuring means. The third movable member may be coupled with the indicating means for directly indicating the size of the object in cooperation with graduations or the like.

Thus, by way of the differential mechanism, the indicating means can always indicate the actual dimension of the object being viewed regardless of the variation in the distance of the object from the forward end portion of the endoscope. The differential mechanism compensates for any variation in the apparent size of the image of the object in the viewing optical system of the endoscope because of variation in distance from the forward portion of the endoscope and the object being viewed.

FIG. 11 shows one form of the differential mechanism of the present invention. Indicating means are fixed to a shaft 25 to which a pinion 21 is secured. The pinion 21 meshes with the rack formed in a shiftable bar 27. The shiftable bar 27 is guided for the limited movement longitudinally thereof by means of elongated holes 19 formed therein engaging with guide pins 15 secured to stationary members in the control housing. Thus, the indicating means is rotated in accordance with the movement of the shiftable bar 27. A pair of racks 30, 31' are shiftably mounted in parallel to the shiftable bar 27 at opposite sides thereof. Elongated holes 32, 34' formed in the racks 30, 31', respectively, slidably engage with guide pins 33' and 35' respectively, for the limited movement of each of the racks 30 and 31' longitudinally thereof in parallel to the shiftable bar 27. A pinion 36' is notably mounted on the shiftable bar 27. The pinion 36' meshes with each of the teeth of the racks 30 and 31'. The pinion 37' is secured to a shaft 38' rotatably supported in the control housing. The pinion 37' meshes with other teeth of the rack 30. The shaft 38' has mounted thereon cam 39' such as that having the contour in the form of the spiral of Archimedes. A swingable lever 40' pivoted at 41' is urged by means of spring 42' so as to contact with the contour of the cam 39'. A rod 43 is pivotably connected to the lever 40' at 44, so that, when a knob secured to the shaft 38' is rotated, the rack 30 is shifted by the engagement of the cam 37' while the rod 43 is shifted by the engagement of the cam 39' with the lever 40'. A shaft 46', cam 47, pinion 48', lever 49' and a rod 51 are arranged in the same manner as described above. Therefore, when a knob secured to the shaft 46' is rotated, the rack 31' is shifted through the engagement thereof with the pinion 48' while the rod 51 is shifted by the engagement of the cam 47' with the lever 49'. It is apparent that the shiftable rod 27 is moved by the resultant amount differentially given from the rack 30 and the rack 31' by virtue of the engagement of the pinion 36' with both the racks 30, 31'. Therefore, the indicating means mounted on shaft 25 is rotated by the amount corresponding to the shifting movement of the shiftable rod 27. In accordance with the present invention, the rod 43 may be operatively coupled with either the adjusting means for the objective lens system, or the distance measuring means for determining the distance of the object from the forward end portion of the endoscope as indicated in FIGS. 1 and 2 while the rod 51 is operatively coupled with the sizing means by way of rod 41. Thus, when the endoscope is operated such that the adjusting of the lens system or the measurement of the distance is varied, a corresponding variance appears in the sizing means with the result being that the indicating means is rotated by the amount corresponding to the resultant movement of the shiftable rod 27 differentially derived from the respective rods 43 and 51 thereby permitting the actual dimension of the object in the field of view to be read by means of the indicating means which may cooperate with a stationary index if desired.

FIG. 12 shows an alternative form of the differential mechanism useful in the present device and based on a planetary gear system. In FIG. 12, the rod 43 is pivotably connected to the lever 40' at 44, and is operatively coupled with the adjusting means or the distance measuring means, such as indicated previously. The lever 40' is pivoted at its one end at 45 while the other end is urged to contact with the cam 39' by means of the spring 42' in the same manner as shown in FIG. 11. Similarly, rod 51 is operatively coupled with the sizing means. The swingable lever 49' pivotably mounted on rod 51 is urged to contact with the cam 47' by means of the spring 53. The shaft 38' having mounted thereon cam 39' is provided with gear 37' at the other end thereof. A plurality of planetary pinions 55 are engaged with gear 37'. The planetary gears 55 also engage with the internal gear teeth of a rotatable ring gear 56. The outer gear teeth of the rotatable ring gear 56 engages with a gear 57 secured to a shaft 46' which is in turn secured to the cam 47'. The gears 55 are rotatably supported by shafts 58' which are secured to indicating disc 59, having thereof graduations for indicating size dimension. Thus, when shaft 38' is rotated, the rod 43 is moved by the engagement of the cam 39' with the rod 40' so as to actuate either the adjusting means or the distance measuring means while gear 37' is rotated so that the planetary gears 55 are moved around gear 37' when the ring gear 56 is kept stationary. Therefore, indicating disc 59 is rotated by the angle corresponding to the movement of the rod 43 such that the amount of the rotation of the disc 59 reflects the distance between the object and the forward end portion of the endoscope correlated with the adjusting means or the distance measuring means. On the other hand, shaft 46' is rotated such that the sizing means is varied by moving rod 51 through the engagement of the cam 47' with lever 49'. Gear 57 secured to the shaft 46' rotates the ring gear 56 thereby permitting the planetary pinions 55 to be moved around the gear 37' so as to rotate the indicating disc 59 for compensating for any variation. Thus, the indicating disc 59 always indicates the actual dimension of the object in the field of view in cooperation with a stationary index provided adjacent to the periphery of the disc 59 despite the fact that the position of the end of the endoscope is varied relative the object being viewed.

FIG. 13 shows another form of the differential mechanism of the present invention in which connecting rods and cams are utilized without employing gear means. In FIG. 13, the rod 43 operatively coupled with the adjusting means or the distance measuring means is pivotally connected to one end of a lever 60' at 61. A roller 62 is rotatably mounted on the lever 60' on or adjacent to the pivotal connection between the rod 43 and lever 60' so as to cooperate with the cam 39'. Rod 51 operatively coupled with the sizing means is pivotally connected to the lever 60' at the midpoint thereof by a pin 63 fixed to the lever 60'. The pin 63 also pivotally supports one end of a bell crank lever 64 pivoted at 65. The other end of the bell crank lever 64 rotatably supports a roller 66 which contacts with the cam 47' fixed to the shaft 46'. Spring 67 is connected to lever 64 so as to positively urge the roller 66 against the cam 46'. The outer end of the lever 60' is provided with an elongated hole 68 in which pin 69 secured to lever 70 is slidably fitted. Th lever 70 is provided with elongated holes 71 in which pins 72 fixed to stationary points in the control housing are slidably fitted so as to guide lever 70 for limited movement thereof longitudinally of the lever 70. The outer end of lever 70 is provided with arm 73 having an index pointer 74 with which graduations 75 provided on a stationary member of the control housing cooperate so as to indicate the actual dimension of the object being measured in the field of view.

In operation, when a knob secured to the shaft 38' is rotated so as to actuate the rod 43 coupled with either the adjusting means or the distance measuring means, cam 39' swings lever 60' about the pin 63 so that lever 70 is shifted by an amount corresponding to the variation of the adjusting means or the distance measuring means by virtue of engagement of pin 69 of the lever 70 with the elongated hole 68. By this means, index pointer 74 is permitted to be moved along the graduations 75 to indicate the actual dimension of the object being measured in the field of view which varies as the distance of the object from the forward end portion of the endoscope varies. On the other hand, when shaft 46' is rotated so as to swing the bell crank lever 64 about the pivoted point 65 by the engaging of the cam 47' with the roller 66 so that the rod 51 is moved to adjust the sizing means, the pin 63 also moves the lever 60' about the pivotal connection indicated at 61 so as to compensate for the movement of the lever 70. Thus, the index pointer 74 always indicates the actual dimension of the object being measured in the field of view despite the fact that the distance of the end of the endoscope from the object varies.

In a variation of the present invention illustrated in FIG. 14, the direction of either one or of each of the two light beams is fixed so that they are directed at known fixed angle to the object 48 within the field of view available by the objective lens system 44. FIG. 14 also presents an illustration of how measurement may be effected using the device of the present invention.

In one form of the present invention illustrated in FIG. 15, the direction of either one or both of one or two light beams may be varied. Wire means 100, for example, may be included to vary the angle of mirror 101 when disposed on supporting pivotal axis 102, and/or wire means 103 may be included to similarly vary the angle of mirror 104 when supported on pivotal axis 105. Wire means 100 may be moved for mirror varying purposes by control knob 106 which may be disposed relative housing 14, and wire means 103 may be moved for mirror varying purposes by control knob 108 similarly disposed as desired. Either one or both of control knobs 106 and 108 may be referenced to indicating marks by coupling to the differential mechanism for noting the distance to the object being measured. It is recognized that either one or two light projecting mirrors may be employed as well as that prism members may be used in place of the mirror members as desired.

FIG. 16 shows an embodiment means for changing the direction of either one or both of the light beams. Either wire 100 or wire 103, or both if desired, may be attached to an axially movable member 110, movable by rotation of wheel 111 through provided teeth elements. Wheel 111 may be positioned near the barrel of ocular element of the housing 14 of FIGS. 3 or 4. Axial movement of member 110 is assured by slide pin 112 secured to the housing with axial movement permitted within element 110 as illustrated in FIG. 16.

FIG. 17 diagrammatically presents elements of FIG. 14 exclusive of detail. Light beam L from collimating lens system 52 partially reflects as beam 115 from mirror 54, and the remainder reflects as beam 116 from mirror 58. The light beams 115 and 116 may be positioned to cross each other at an angle $\beta$ at a certain distance from the forward end portion 12 and measurement D may thus be effected. Also, the angle $\beta$ may be made zero, i.e., the two light beams may be made parallel to each other in which case measurement is effected such as described subsequently.

The positions of the two light spots relative to each otehr with respect to the field of view of the endoscope as seen in the focal plane of the ocular means 16 vary as the distance D of the object from the forward end portion 12 varies when the angle β is set to a fixed value. Therefore, the distance D between object 48 and the forward end portion 12 can be determined on the basis of the relative positions of the two light spots with respect to the field of view as seen in the focal plane of the ocular means 16, noting FIG. 18.

Graduations 117 are provided in the focal plane of the ocular means 16 as shown in FIG. 18, along with object 48, and size measuring means 118. The location of the graduations 72 is so determined that it extends in the direction corresponding to the location of the plane including the optical axis extending from the light-reflecting mirrors to the object 48.

When the distance between the object 48 and the forward end portion 12 of the endoscope is varied, for example, then the position of the light spot or spots formed by the light beam or beams on the surface of the object 48 as viewed through the ocular means also varies with respect to the field of view available, thereby permitting the position of the light spot 120 to be read out by means of the graduations 117. Thus, the distance between object 48 and the forward end portion 12 can be determined by the medium of the graduations 117 provided in the focal plane of the ocular means to serve as a light spot reference point for fixing distance D.

Alternatively, a movable index mark 121 of FIG. 19 may be provided in place of the graduations 117 so that the index mark 121 or the image thereof formed by a conventional optical system is moved in the focal plane of the ocular means 16 by means of a control knob provided on the control housing 14. The movement of the index mark 121 may be controlled by the control knob so that the index mark 121 is brought into registration with the light spot as viewed in the focal plane of the ocular means 16. Thus, the distance of the object 48 from the forward end portion 12 is determined on the basis of the amount of the operation of the control knob by means of the differential mechanism for bringing the index mark 121 into registration with the light spot. To this end, an indicating means may be provided in the control housing as indicated previously which indicates the amount of movement of the control knob by way of the differential mechanism in terms of the distance of the object 48 from the forward end portion 12 of the endoscope.

Further illustrations of how present distances may be determined using the present device are disclosed in parent application, now U.S. Pat. No. 3,595,220, the disclosure of which is incorporated herein by reference.

Thus, with reference to fIGS. 17–19, measurement of distance D may be effected as follows. Mirror 54 and 58 are fixed in position thereby fixing angles α and γ respectively. When the beams of light 115 and 116 cross at the object 48, and when the resulting spot 120 appears at a pre-determined reference location using reference lines 117, by way of example, within the field of view, then the value D become known. This determination is thus based on simple mathematics.

FIGS. 20 and 21 present the situation, for example, when the reflecting angle of either one or both of mirrors 54 and 58 vary. The procedure is essentially the same as that indicated previously except two spots 122 and 123 are involved. Since the mirror angles are predetermined by using means illustrated in FIGS. 15 or 16, angles α and γ of beams 70 and 72 also ecome known. Simply, measurement may be effected using spots 122 and 123 when registered into a reference location such as FIG. 21.

Referring to FIGS. 23 and 23, when angle β is set to zero, the coincidence of the two light spots 122 and 123 do not occur. However, the apparent distance between the two light spots as viewed in the focal plane of the ocular means 16 varies as the distance of the object 48 from the forward end portion 12 varies. This variation results because although the beams are formed of substantially parallel rays, they may diverge with distance resulting in spots of greater diameters on the object. Therefore, the distance D of the object 48 from the forward end portion 12 can be determined on the basis of the distance M between the two light spots 122 and 123 with respect to the field of view of the endoscope, noting FIG. 12.

Thus, in accordance with a feature of the present invention, either one or both of the light reflecting mirrors 54 and 58 or similar means may be rotated by the operation of a control mechanism through a differential mechanism provided on control housing 14. Either one or both of the light reflecting mirrors 54 and 58 may be rendered movable such that either one or both of the light spots formed on the surface of the object 48 may be moved to bring the two light spots into registration with each other, i.e., the FIG. 17 illustration, or into a predetermined relation with respect to the field of view, i.e., the FIG. 20 illustration. The amount of the operation of the control mechanism for bringing the two light spots into registration with each other or into a predetermined relation with respect to the field of view varies according to the distance D between the object 48 and the forward end portion 12. Therefore, the distance D of the object 48 from the forward end portion 12 can be either directly determined or suitable means are included by way of a differential mechanism for providing read out of the distance D on the control housing.

It will be apparent from the foregoing that the present device provides great versatility, great efficiency and simplicity of construction affording wide use.

The various elements of the present device may be secured to adjoining elements by any suitable means.

Although a preferred embodiment of the present invention has been illustrated herein, it is to be understood that various changes and modifications may be made in the construction and arrangement of elements without departing from the spirit and scope of the invention as defined.

What is claimed is:

1. In a device for measuring the actual dimension of an object in the field of view available by an endoscope having a forward end portion adapted to be inserted into a hollow portion of a living body or the like for the inspection thereof, a control housing and an elongated tube connecting said forward end portion to said control housing, an objective lens system of fixed focal length arranged in said forward end portion, an image transmitting optical system such as a fiber optical system extending from said forward end portion through said elongated tube to said control housing thereby permitting an image of the object focused by said objective lens system onto the forward end of said image transmitting optical system to be transmitted therethrough to the rearward end thereof so as to be viewed through an ocular means provided in said control housing, said device further comprising focus adjusting means for said objective lens system, wherein the improvement comprises sizing means having movable members adapted to be moved to define the contour of the object as viewed within the field of view through said ocular means the dimension of which is to be measured, a differential mechanism differentially coupling said sizing means with said focus adjusting means so as to detect the amount of the resultant movement of said differential mechanism, and an indicating means operatively coupled with said differential mechanism so as to be actuated thereby in accordance with said detected resultant movement of said differential mechanism, thereby permitting the actual dimension of the object within the field of view to be directly indicated by means of said indicating means regardless of the variation in the apparent dimension of the object within the field of view as viewed through said ocular means occurring when the distance of the object from the forward end portion of the endoscope is varied.

2. The device of claim 1 wherein the sizing means comprises a caliper having measuring spaced pointers.

3. The device of claim 1 wherein the sizing means comprises a pair of blades pivotally mounted in symmetrical relation to each other, the blades provided with cut out portions adapted for size measurement.

4. The device of claim 1 wherein the sizing means comprises an iris disphragm.

5. In a device for measuring the actual dimension of an object in the field of view available by an endoscope having a forward end portion adapted to be inserted into a hollow portion of a living body or the like for the inspection thereof, a control housing and an elongated tube connecting said forward end portion to said control housing, an objective lens system of fixed focal length arranged in said forward end portion, an image transmitting optical system such as a fiber optical system extending from said forward end portion through said elongated tube to said control housing thereby permitting an image of the object focused by said objective lens system provided in said forward end portion onto the forward end of said image transmitting optical system to be transmitted therethrough to the rearward end thereof so as to be viewed through an ocular means provided in said control housing, said device further comprising distance measuring means for determining the distance of the object from the forward end portion of the endoscope, wherein the improvement comprises sizing means having movable members adapted to be moved to define the contour of the object as viewed within the field of view through said ocular means the dimension of which is to be measured, a differential mechanism differentially coupling said sizing means with said distance measuring means so as to detect the amount of the resultant movement of said differential mechanism, and an indicating means operatively coupled with said differential mechanism so as to be actuated thereby in accordance with said detected resultant movement of said differential mechanism, thereby permitting the actual dimension of the object within the field of view to be directly indicated by means of said indicating means regardless of the variation in the apparent dimension of the object within the field of view as viewed through said ocular means occurring when the distance of the object from the forward end portion of the endoscope is varied.

6. The device of claim 5 wherein the distance measuring means comprises at least one light beam having substantially parallel rays of light emitted from the forward end of the endoscope within the field of view.

* * * * *